United States Patent
Yoshizaki et al.

[11] Patent Number: 5,851,495
[45] Date of Patent: Dec. 22, 1998

[54] ELECTRICALLY HEATED CATALYTIC CONVERTER FOR AN ENGINE

[75] Inventors: Kouji Yoshizaki, Numazu; Shogo Konya, Kawasaki, both of Japan

[73] Assignee: Toyota Jidosha Kabushiki Kaisha, Aichi, Japan

[21] Appl. No.: 725,672

[22] Filed: Oct. 1, 1996

[30] Foreign Application Priority Data

Oct. 2, 1995 [JP] Japan .................................. 7-255377

[51] Int. Cl.⁶ ...................................................... F01N 3/28
[52] U.S. Cl. .................... 422/174; 422/180; 422/199; 422/222; 60/300; 228/121; 228/124.5
[58] Field of Search ................................ 422/174, 199, 422/180, 222; 60/300; 428/116, 593, 594; 228/121, 124.5; 502/439, 527; 55/DIG. 30

[56] References Cited

U.S. PATENT DOCUMENTS

| | | | |
|---|---|---|---|
| 5,070,694 | 12/1991 | Whittenberger | 422/174 |
| 5,094,074 | 3/1992 | Nishizawa et al. | 60/300 |
| 5,174,968 | 12/1992 | Whittenberger | 422/174 |
| 5,529,759 | 6/1996 | Sanada et al. | 422/174 |
| 5,554,342 | 9/1996 | Hirayama et al. | 422/174 |
| 5,573,731 | 11/1996 | Yoshizaki et al. | 422/174 |
| 5,618,498 | 4/1997 | Konya et al. | 422/174 |

FOREIGN PATENT DOCUMENTS

| | | |
|---|---|---|
| 4-281851 | 10/1992 | Japan . |
| 5-171928 | 7/1993 | Japan . |
| 5-179939 | 7/1993 | Japan . |
| 7-171405AZ | 11/1995 | Japan . |
| WO 92/18245 | 10/1992 | WIPO . |

*Primary Examiner*—Hien Tran
*Attorney, Agent, or Firm*—Kenyon & Kenyon

[57] ABSTRACT

The electrically heated catalytic converter of the present invention has a substrate, for a catalyst, which is formed as a laminated assembly of corrugated metal sheets and plain metal sheets. The corrugated metal sheet has an insulating coating made of an alumina $Al_2O_3$, and the plain metal sheet has no insulating coating. Local conductive connections are formed between the layers of the metal sheets by soldering the metal sheets using strips of zirconium solder foils interposed between the layers of the metal sheets. The strips of solder foils are arranged in such a manner that the strips of solder foil disposed on both sides of the corrugated metal sheet defines a single electric path in the corrugated metal sheet which connects the solder foils on both sides of the corrugated metal sheet. Since the solder foils on both sides of the corrugated metal sheet are connected by only one electric path, the electric resistance between the solder foils is maintained at a relatively high value and the local conductive connections can be heated by a relatively small electric current.

8 Claims, 8 Drawing Sheets

COPENDING APPLICATION

Fig.14

COPENDING APPLICATION

ELECTRICALLY HEATED CATALYTIC CONVERTER FOR AN ENGINE

BACKGROUND OF THE INVENTION

1. Field of the Invention

The present invention relates to an electrically heated catalytic converter having a substrate, for a catalyst, formed as a laminated assembly of thin metal sheets.

2. Description of the Related Art

An exhaust gas purification device that utilizes a three-way reducing and oxidizing catalytic converter disposed in the exhaust passage of an internal combustion engine is commonly used. Generally, the catalyst used in such converters is able to purify the pollutants in the exhaust gas only when the temperature of the catalyst exceeds a certain temperature, i.e., the catalysts in the converter do not work when the temperature of the catalyst is-below an activating temperature.

Usually, once the engine starts, the catalyst in the converter is gradually heated by the exhaust gas of the engine and reaches the activating temperature. However, when the temperature of the engine is low, such as during a cold start, it takes a substantially long time to heat the catalyst to the activating temperature, since the heat of the exhaust gas is absorbed by the cold wall of the exhaust passage before reaching the converter. Therefore, during a cold start of the engine, the exhaust gas from the engine is not sufficiently purified since the temperature of the catalyst is lower than the activating temperature.

To solve this problem, copending U.S. patent application No. 08/449,325 proposes an electrically heated catalytic converter having a metal substrate for supporting catalyst which also act as an electric heater when electricity is supplied to the substrate.

Figure 13:
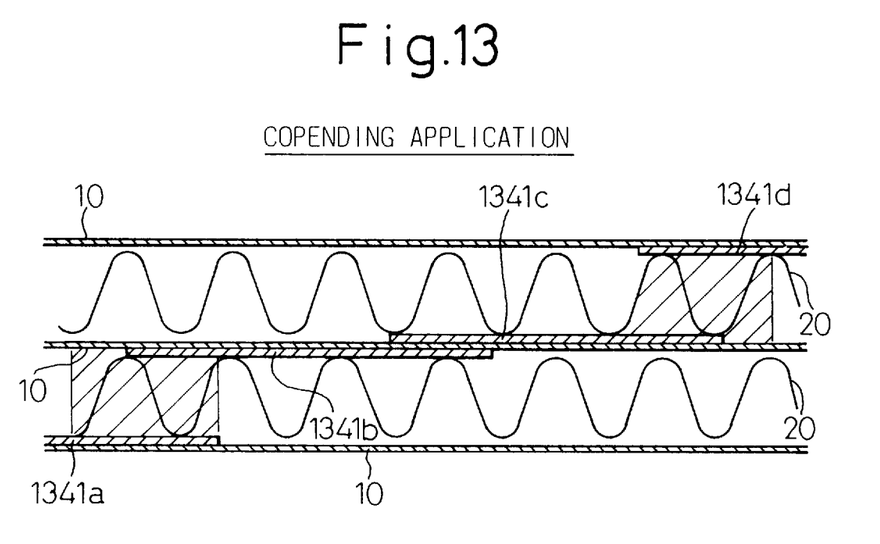
FIG. 13 is a cross sectional drawing schematically illustrating the local conductive connections in the related art.

FIG. 13 shows an enlarged cross section of the substrate of the electrically heated catalytic converter disclosed in the copending U.S. patent application No. 08/449,325. As shown in FIG. 13, the substrate of the electrically heated catalytic converter in the copending application is formed as a laminated assembly of layers of plain metal sheets 10 and corrugated metal sheet 20 placed one upon another. Electrodes for supplying electricity (not shown in the drawing) are attached to both end layers of the laminated assembly. An insulating coating is applied on the surfaces of the plain metal sheet 10 or the corrugated metal sheet 20. The plain metal sheet 10 in each layer is joined to the corrugated metal sheet 20 of the adjoining layer by the strips of solder foils. The solder foils are made of material which is capable of connecting the plain metal sheet and the corrugated metal sheet mechanically and electrically through the insulating coating. Thus local conductive connections which electrically connects the plain metal sheet 10 and the corrugated metal sheet 20 are formed in the laminated assembly.

In the copending application, as shown in FIG. 13, the strips of solder foils are arranged in such a manner that the strips of solder foils disposed on both sides of the corrugated metal sheet 20 (for example, the strips 1341a and 1341b, or 1341c and 1341d) overlap each other by only a portion when viewed from a direction perpendicular to the layers of plain metal sheet and corrugated metal sheet.

By disposing the strips of solder foil on both sides of the corrugated metal sheet in the manner explained above, electric current flows from one plain metal sheet to another plain metal sheet only through the part of the corrugated metal sheet in the overlapped portion (i.e., a hatched portion in FIG. 13). Therefore, the electricity concentrates in the small overlapped portions, and the part of the corrugated metal sheet in this portion is rapidly heated by a small electric current. Thus, these overlapped portions act as heat spots to start the catalytic reaction in the substrate. Once the catalytic reactions starts in the heat spots in the substrate, the portion around the heat spots are also rapidly heated by the heat generated by the reaction and, thereby, the whole substrate is heated to the activating temperature in a short time.

However, though, in the copending U.S. patent application No. 08/449,325, electric paths having small cross sectional area are formed in the corrugated metal sheet within the above-noted overlapped portions of the strips of solder foil, in some cases, the cross sectional area of the electric paths is not sufficiently small. This problem is explained with reference to FIG. 14.

Figure 14:
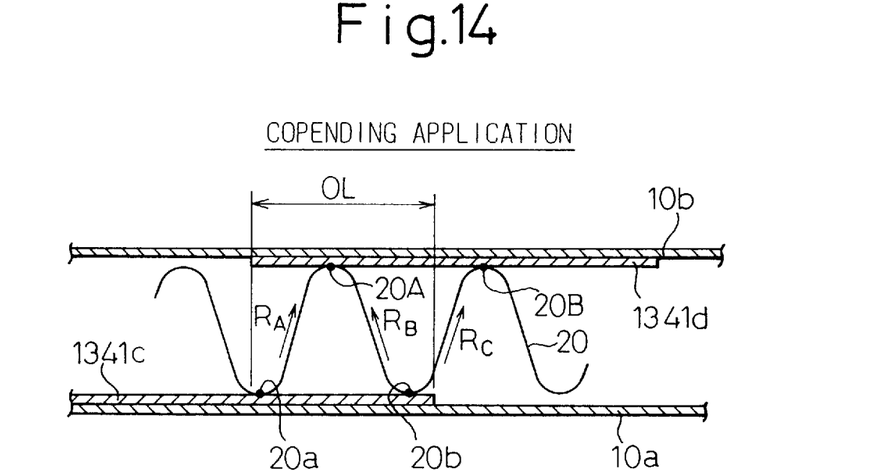
FIG. 14 is an enlarged cross sectional drawing illustrating the electric paths formed in the corrugated metal sheet according the related art.

FIG. 14 shows one of the hatched portions in FIG. 13 in a larger scale. In FIG. 14, the overlapped portion formed by the strips of solder foils 1341c and 1341d is denoted by the length OL. It is assumed that electric current flows from the plain metal sheet 10a to the plain metal sheet 10b through the corrugated metal sheet 20 when electricity is supplied. In this case, electric current flows through the portion of the corrugated metal sheet 20 contained in the overlapped portion OL, i.e., the portion of the corrugated metal sheet 20 contained in the overlapped portion OL forms electric paths.

However, in the case shown in FIG. 14, one upper peak 20A of the corrugated metal sheet 20 is connected to the plain metal sheet 10b by the strip 1341d of the solder foil disposed on the upper side of the corrugated metal sheet 20, and two lower peaks 20a and 20b are connected to the plain metal sheet 10a by the strip 1341c of the solder foil disposed on the lower side of the corrugated metal sheet 20. In this case, a total of three electric paths are formed in the corrugated metal sheet 20 in a parallel arrangement, i.e., an electric path $R_A$ which connects the upper peak $20_A$ and lower peak 20a, an electric path $R_B$ which connects the upper peak $20_A$ and the lower peak 20b and an electric path $R_C$ which connects the upper peak $20_B$ (which is located outside of the overlapped portion OL) and the lower peak 20b, are formed within the corrugated metal sheet 20. The numbers of the electric paths increases as the number of the upper peaks and the lower peaks of the corrugated metal sheet in the overlapped portion OL increases.

Since the plain metal sheets 10a and 10b are connected by three electric paths $R_a$, $R_B$ and $R_C$, the total cross sectional area of the electric paths is relatively large in this case, the intensity of the electric current becomes smaller. Therefore, when the number of the electric paths formed in the corrugated metal sheet is large, the heat generated by the respective electric paths becomes relatively small, and a longer time is required for heating the local conductive connections. Further, since a plural electric paths are formed in the overlapped portion OL in the case of FIG. 14, the overall electric resistance of the overlapped portion becomes smaller. This causes an increase in the total amount of electric current flowing through the portion of the corrugated metal sheet in the overlapped portion OL and, thereby, increases the load on the battery.

Further, since the overlapped portion acts as a heat spot which initiates the catalytic reaction, it is preferable to form as many local conductive connections (the overlapped portions as explained above) as possible in order to raise the temperature of the substrate in a short time. However, if a plurality of the electric paths are formed in the corrugated metal sheet within the overlapped portions, since the electric resistance of the respective local conductive connections become small, the number of the overlapped portion must be reduced to avoid the overall electric resistance of the substrate from being excessively small.

SUMMARY OF THE INVENTION

In view of the problems in the related art as set forth above, the object of the present invention is to provide a substrate of an electrically heated catalytic converter which is capable of raising the temperature of the substrate in a short time with a relatively small amount of electricity by minimizing the number of the electric paths formed in the corrugated metal sheet within the local conductive connections.

This object is achieved by an electrically heated catalytic converter for an engine according to the present invention, which comprises a substrate supporting a three-way reducing and oxidizing catalyst. The substrate includes a laminated assembly of layers having a plain metal sheet, a corrugated metal sheet, a thin insulating layer interposed between the plain metal sheet and the corrugated metal sheet. The thin insulating layers are made of an oxide of a first metal. Each layer of the laminated assembly further comprises a local conductive connection including strips of solder foil which electrically connect the plain metal sheet in the each layer to the corrugated metal sheet in the each layer through the thin insulating layer. The local conductive connection electrically connects the corrugated metal sheet in the each layer to the plain metal sheet in the layer adjoining the each layer through the thin insulating layer. The strips of solder foil are made of a soldering material containing a second metal having a larger reducing capability than the first metal, and the strips of solder foil are arranged in such a manner that the strips of solder foil disposed on both sides of the corrugated metal sheet define a single electric path which connects the strips of solder foil disposed on both sides of the corrugated metal sheet through the corrugated metal sheet therebetween. The strips of solder foils disposed on both sides of the corrugated metal sheet may be, or may not be, overlapped each other when viewed from a direction perpendicular to the layer of the metal sheets.

According to the present invention, since only one electric path in the corrugated metal sheet which connects the strips of solder foil disposed on both sides of the corrugated metal sheet is formed in the respective local conductive connections, the electric resistance of the respective local conductive connections are relatively high. Therefore, the over all electric resistance of the substrate can be maintained at high value even if the number of the local conductive connections in the substrate is increased. Therefore, the number of the heat spots can be increased without increasing the over-all electric current flow through the substrate.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

In the embodiments explained hereinafter, the present invention is applied to an electrically heated catalytic converter of the scroll-like cylindrical laminated assembly type, in which a corrugated metal sheet and a plain metal sheet are placed one upon another and wound around a center electrode so that the metal sheets are laminated in the shape of a scroll-like cylinder.

Therefore, before explaining the respective embodiments, the construction of the electrically heated catalytic converter of a scroll-like cylindrical laminated assembly type used in these embodiments is explained with reference to FIGS. 1 through 3. In the explanations of the respective embodiments, reference numerals which are the same as those in FIGS. 1 through 3 designate the same elements as those shown in FIGS. 1 through 3.

Figure 1:
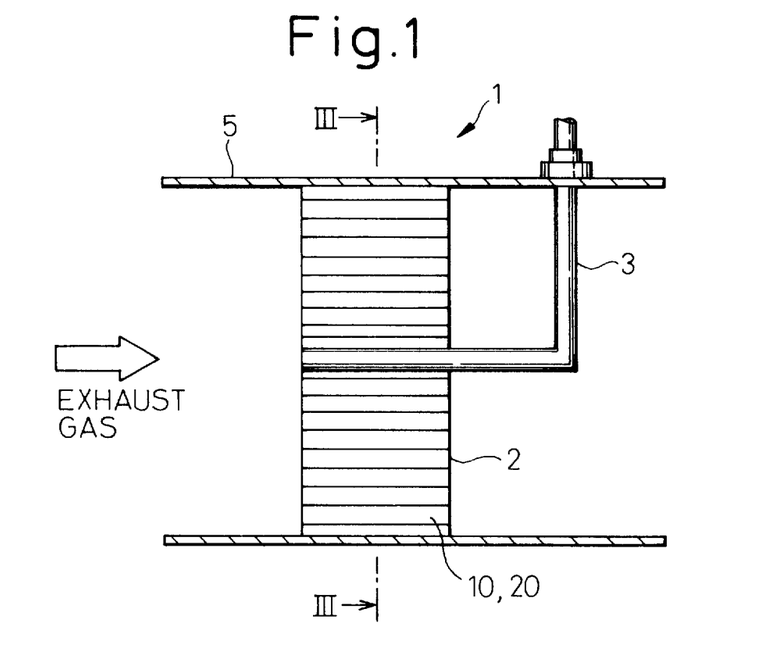
FIG. 1 is a sectional view illustrating the general construction of the electrically heated catalytic converter.

FIG. 1 is a typical sectional view of an electrically heated catalytic converter of the scroll-like cylindrical laminated assembly type used in the embodiments of the present invention. In FIG. 1, reference numeral 1 designates an electrically heated catalytic converter as a whole. Numeral 2 is a substrate formed as a cylindrical laminated assembly of the metal sheets. Numerals 10 and 20, respectively, designate the plain metal sheet and corrugated metal sheet which constitute the cylindrical laminated assembly 2. Numeral 3 is a center electrode disposed at the center of the cylindrical laminated assembly 2. The center electrode 3 is a metal rod type electrode connected to both the plain metal sheet 10 and the corrugated metal sheet 20 and acts as a positive electrode. The cylindrical laminated assembly 2 is contained in a metal casing 5. The outer surface of the cylindrical laminated assembly 2 is connected to the inner surface of the casing 5, and the casing 5 acts as a negative outer electrode. Therefore, when a voltage is imposed across the center electrode 3 and the casing 5, an electric current flows through the plain metal sheet 10 and the corrugated metal sheet 20.

Figure 2:
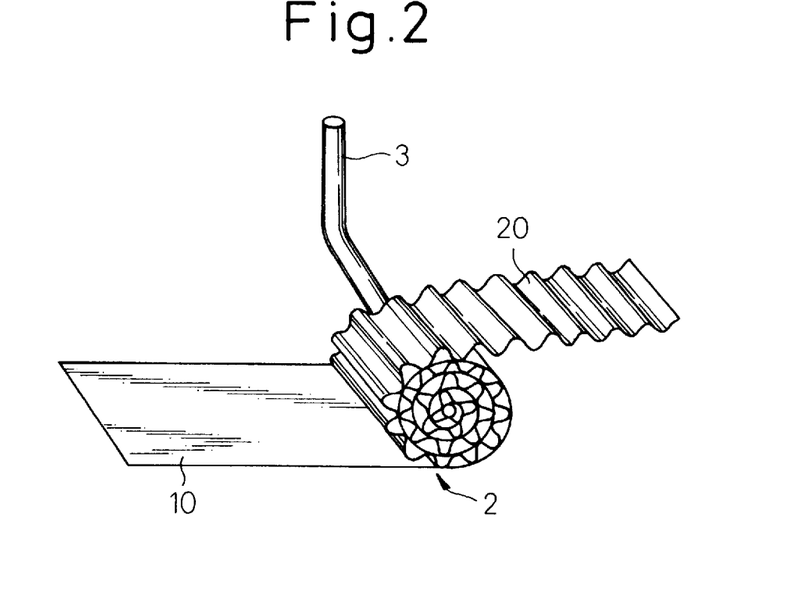
FIG. 2 is a drawing illustrating the construction of the laminated assembly of the electrically heated catalytic converter.
Figure 3:
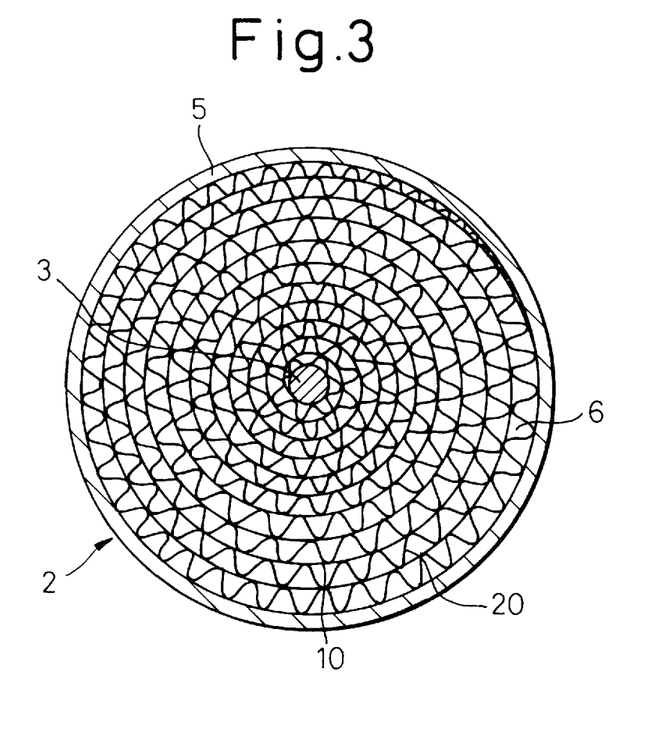
FIG. 3 is a drawing showing a sectional view taken along the line III—III in FIG. 1.

FIGS. 2 and 3 illustrate the construction of the cylindrical laminated assembly 2 of FIG. 1. As shown in FIG. 2, the cylindrical laminated assembly 2 is formed by placing the belt shaped plain metal sheet 10 and the corrugated metal sheet 20 one upon another, and attaching the center electrode 3 to the end of the metal sheets 10 and 20, then winding the laminated metal sheets 10 and 20 around the center electrode 3.

FIG. 3 shows a sectional view of the cylindrical laminated assembly 2 taken along the line III—III in FIG. 1. Since the plain metal sheet 10 and corrugated metal sheet 20 are laminated, and wound around the center electrode 3, a number of axial passages 6 are formed between the peaks of the corrugated metal sheet and the plain metal sheet and are arranged in a spiral in the laminated assembly 2.

As explained later, a catalyst is attached to the surface of the metal sheets 10 and 20. When the casing 5 of the converter 1 is connected to an exhaust passage of the internal combustion engine, the exhaust gas flows through the axial passages 6, and the pollutants in the exhaust gas are purified by the catalyst attached to the walls of the passages 6.

Both the plain metal sheet 10 and the corrugated metal sheet 20 are made of a ferrous alloy containing aluminum (such as 75% Fe-20% Cr-5% Al alloy) and are approximately 50 microns thick. An electrically insulating coating of a metal oxide (such as aluminum oxide (alumina, $Al_2O_3$) about 1 micron thick is formed on the surface of the metal sheets 10 and 20. In the embodiments of the present invention, the insulating coating of $Al_2O_3$ is formed on at least one of the metal sheets 10 and 20, or both, prior to the assembly of the cylindrical laminated assembly. The insulating coating can be formed on the surface of the metal sheets by baking a raw metal sheet (i.e., metal sheet having no insulating coating) in an oxidation atmosphere. Further, a wash coat of approximately 30 microns thick which act as a carrier of the particles of the catalyst is formed on the bare metal surface of the raw metal sheets or on the alumina insulating coating of the insulated metal sheets (i.e., a metal sheet having the insulating coating). The catalyst components, such as platinum Pt, rhodium Rh, and palladium Pd are impregnated in this wash coat.

In the electrically heated catalytic converter of the present invention, very narrow electric paths are formed in the laminated assembly 2 by local conductive connections where the thin metal sheets of the respective layers are joined by solder foils as explained later. When electricity is fed to the laminated assembly 2, electric currents concentrate in the narrow electric paths formed by the local conductive connections instead of flowing through the cross section of the metal sheets uniformly. Thus, only the portion of the metal sheets around the local conductive connections, instead of the entire metal sheets, are heated by the electric currents flowing through the electric paths, and are heated up rapidly.

When the local temperatures of these portions reach the activating temperature of the catalyst (such as about 300° to 400° C.), the oxidation reaction of the HC and CO components in the exhaust gas starts immediately due to the catalyst, and the heat generated by the reaction is conducted, through the metal sheets, to heat up the entire laminated assembly 2. Therefore, the temperature of the entire laminated assembly 2 rises rapidly, and reaches the activating temperature of the catalyst a short time after electricity is fed to the converter 1.

Further, since the cross sections of the conductive connections can be kept small, the resistance of the electric paths connecting the electrodes can be kept high. Therefore, total amount of the electric current becomes small while the electric currents flowing through the electric paths are kept relatively high.

In the embodiments explained hereinafter, the corrugated metal sheet 20 is formed as an insulated metal sheet which has insulating coatings of alumina ($Al_2O_3$) on its surfaces, and the plain metal sheet 10 is formed as a raw metal sheet which has bare surfaces. The plain metal sheet 10 and the corrugated metal sheet 20 are laminated and wound around the center electrode 3 as shown in FIG. 2, to form the scroll-like cylindrical laminated assembly 2. The radial local conductive connections are formed by soldering the peaks of the corrugated metal sheet 20 to the plain metal sheet 10 of the adjacent layers in such a manner that the plain metal sheet 10 and the corrugated metal sheet 20 connect to each other electrically through the insulating coating of the corrugated metal sheet 20. The electric paths connecting the center electrode 3 and the outer electrode 4 are formed by these local conductive connections.

Figure 4:
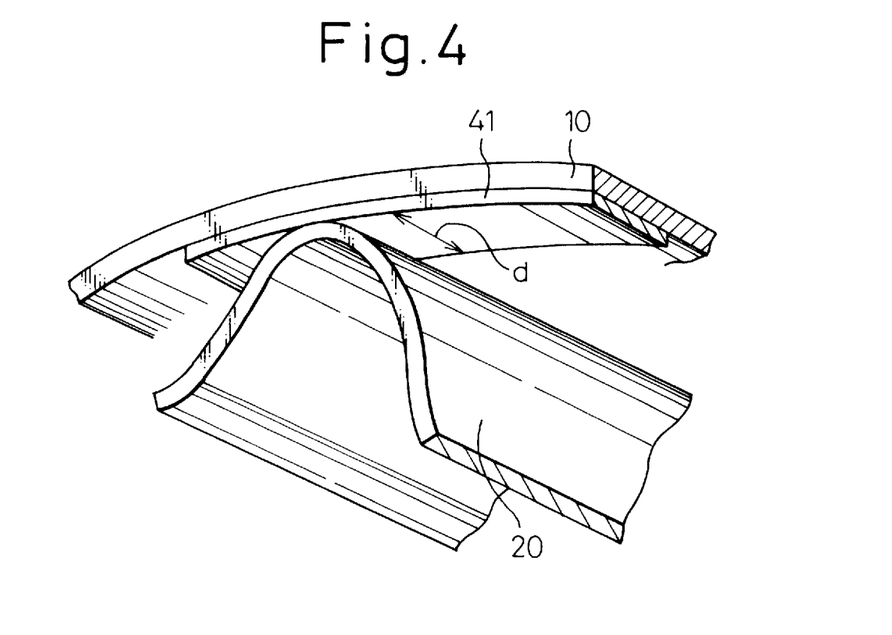
FIG. 4 is a drawing showing an enlarged view of an example of the local conductive connection formed between a raw metal sheet and an insulated metal sheet.

FIG. 4 shows the constructions of the local conductive connections of the present embodiment. In this embodiment, when the metal sheets 10 and 20 are laminated, strips of solder foils 41 having a predetermined width d are interposed between the plain metal sheet 10 and corrugated metal sheet 20 at the portions where the conductive connections are to be formed. The solder foils 41 are made of soldering material which contains a metal component, such as zirconium Zr, having a higher reducing capability than the metal oxide forming the insulating coating (in this embodiment, alumina $Al_2O_3$). After forming the laminated assembly 2, the whole assembly 2 is heated, for example, in a furnace to join the plain metal sheet 10 and the peaks of the corrugated metal sheet 20 by soldering. When the solder foil 41 melts, the zirconium component in the solder foil forms zirconium oxide by taking oxygen away from alumina $Al_2O_3$. Therefore, aluminum, which acts as conductor connecting the plain metal sheet 10 and the peaks of the corrugated metal sheet 20 precipitates within the insulating coatings at the soldered portions. Thus, the local conductive connections are formed between the plain metal sheet 10 and the corrugated metal sheet 20.

Figure 5:
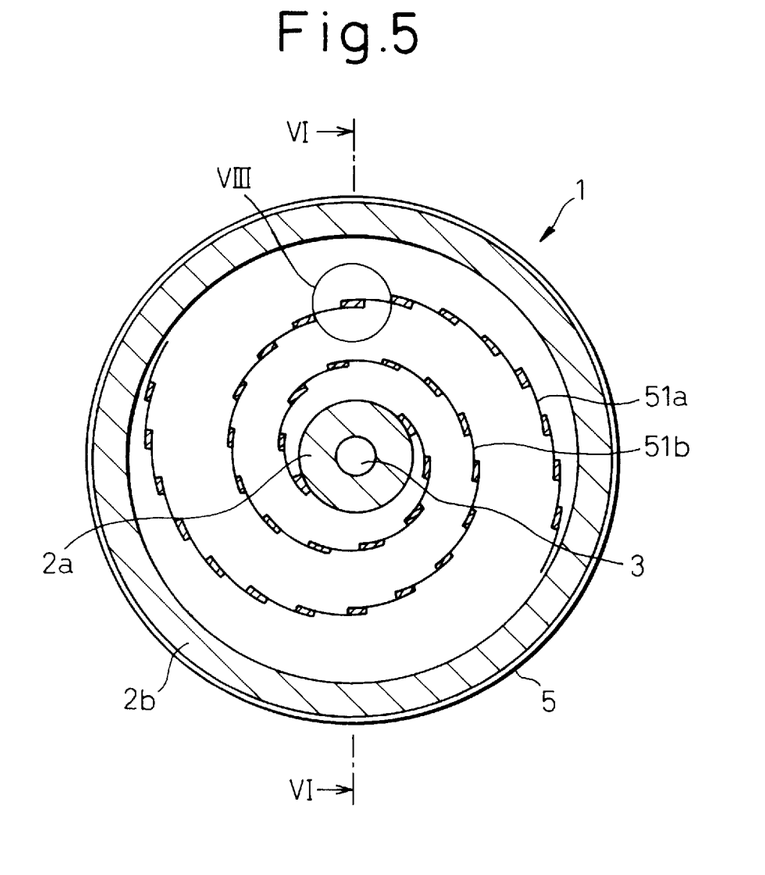
FIG. 5 is a drawing showing an example of the arrangement of electric paths formed in the laminated assembly according to an embodiment of the present invention.

In this embodiment, the local conductive connections are formed on the exhaust inlet side end face 2d of the laminated assembly 2 in such a manner that the local conductive connections are arranged in double spirals 51a and 51b as shown in FIG. 5. At the respective local conductive connections, the plain metal sheet 10 and the corrugated metal sheet 20 are joined over the depth from the end face 2d equal to the width d (FIG. 4) of the solder foils 41. The region around the center electrode 3 and the region adjacent to the outer electrode 5 are the regions where the thin metal sheets 10 and 20 in the respective layers are joined along the entire length of the metal sheets, so that annular conductive zones 2a and 2b are formed.

Figure 6:
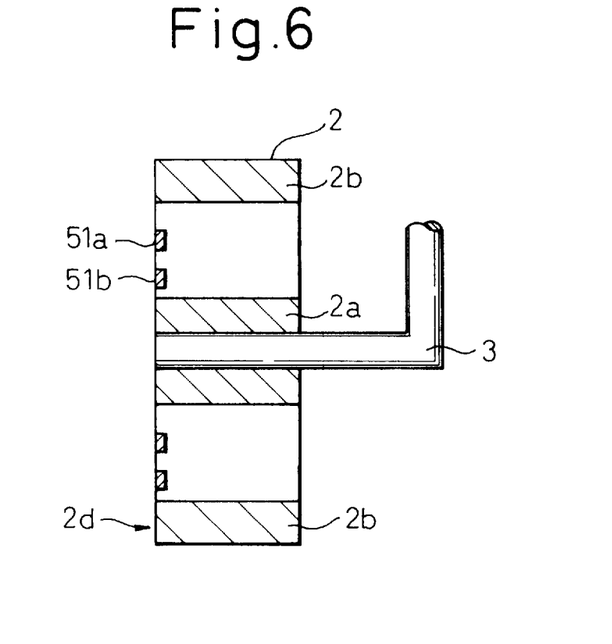
FIG. 6 shows a section of the laminated assembly taken along the line VI—VI in FIG. 5.

FIG. 6 shows a section along the line VI—VI in FIG. 5. In FIG. 5, the hatched portions indicate the portions where the thin metal sheets 10 and 20 are connected. As shown in FIG. 6, the plain metal sheet 10 and the corrugated metal sheet 20 are connected over the width of the thin metal sheets (i.e., over the axial length of the laminated assembly) in the annular conductive zones 2a and 2b while the plain metal sheet 10 and the corrugated metal sheet 20 are connected over the depth d (for example, d is 0.5 to 3 mm) from the end face 2d in the local conductive connections between the zones 2a and 2b. Thus, spiral electric paths 51a and 51b having small cross sections and connecting the annular conductive zones 2a and 2b are formed by the local conductive connections.

The annular conductive zones 2a and 2b may be formed by soldering the plain metal sheet 10 and the corrugated metal sheet 20 using the solder foils containing a zirconium component in a similar manner to that shown in FIG. 4. However in this embodiment, the annular conductive zones 2a and 2b are formed by the process illustrated in FIG. 7.

Figure 7:
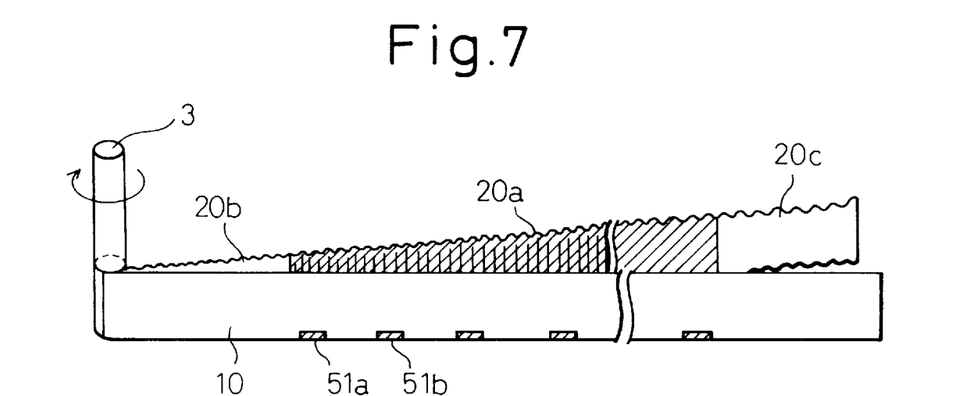
FIG. 7 is a drawing illustrating the method for forming the conductive zones formed around the center electrode and outer peripheral of the laminated assembly in FIG. 5.

As shown in FIG. 7, the corrugated metal sheet 20 in this embodiment is formed as a compound metal sheet which consists of a corrugated insulated metal sheet 20a and corrugated raw metal sheets 20b and 20c, connected to both longitudinal ends of the corrugated insulated metal sheet 20a. The raw metal sheet section 20b is connected to the center electrode 3, and a slurry of soldering material containing a nickel component is applied to the surfaces of the raw metal sheet sections 20b and 20c. Then, the plain raw metal sheet 10 is laminated on the compound corrugated metal sheet 20, and the metal sheets 10 and 20 are together wound around the center electrode 3. Therefore, when the scroll-like laminated assembly is formed, the compound corrugated metal sheet 20 and the plain raw metal sheet 10 in the annular conductive zones 2a and 2b are laminated via a layer of soldering material containing a nickel component. Therefore, when the whole laminated assembly is heated, the raw metal surfaces of the compound corrugated metal sheet 20 and the plain metal sheet 10 in the annular conductive zones 2a and 2b are soldered by the nickel solder. Therefore, the raw metal sections of the corrugated metal sheet 20 and the plain raw metal sheet 10 are directly soldered in the zones 2a and 2b. Since the bare metal surfaces are soldered without interposing the insulating coating in the conductive zones 2a and 2b, the junction strength between the metal sheets 10 and 20 is increased.

Further, though the local conductive connections in the electric paths 51a and 51b are formed by connecting the plain metal sheet (raw metal sheet) 10 and the corrugated metal sheet (insulated metal sheet) 20 using only the zirconium solder foils 41, compound solder foils in which nickel solder foils and zirconium solder foils are laminated may be used. In this case, the nickel solder foils are placed on the plain metal sheet (raw metal sheet) 10 side and the zirconium solder foils are placed on the corrugated metal sheet (insulated metal sheet) 20 side. Since the nickel solder has good affinity with both the zirconium solder and the material of the raw metal sheet, by using the compound solder foils, a larger junction strength between the plain metal sheet 10 and the corrugated metal sheet 20 can be obtained.

Figure 8:
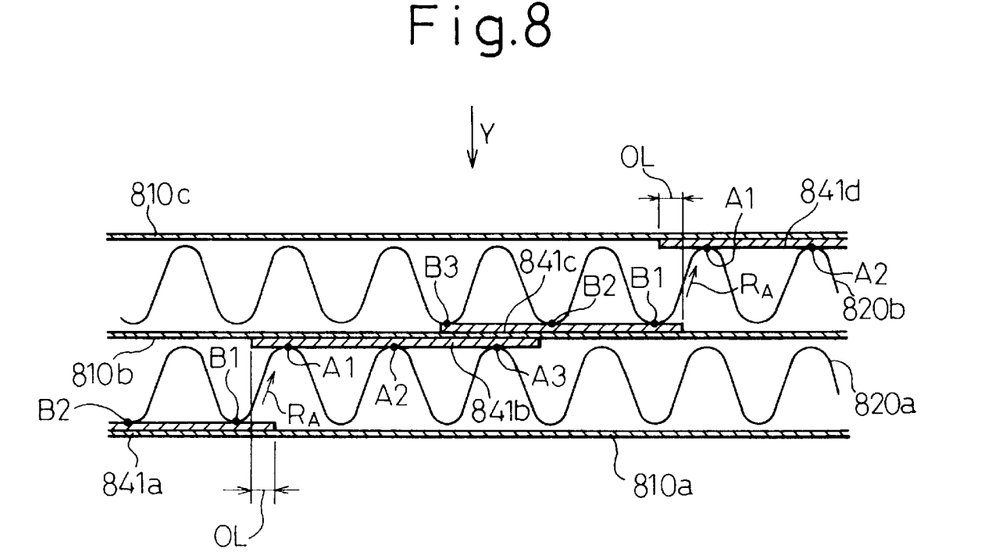
FIG. 8 schematically illustrates the electric paths formed in the corrugated metal sheet according to an embodiment of the present invention.

Next, the configuration of the electric paths 51a and 51b of the present embodiment is explained in detail. FIG. 8 is an enlarged view of the portion VIII in FIG. 5. In FIG. 8, 810a, 810b and 810c are portions of the plain metal sheet 10 in the laminated assembly 2, 820a, and 820b are portions of the corrugated metal sheet 20 disposed between the plain metal sheet 810a and 810b, 810b and 810c, respectively. Between the plain metal sheet 10 and the corrugated metal sheet 20, zirconium solder foils 841a through 841d are interposed. Each of the zirconium solder foils 841a through 841d is 0.5 to 3 mm wide (i.e., the length in the direction along the axis of the laminated assembly is 0.5 to 3 mm).

As shown in FIG. 8, the solder foils in respective layers of the laminated assembly 2 formed, for example, between portions 810a, 810b and 810c of the sheet 10 are disposed in such a manner that the solder foils disposed on both sides of the corrugated metal sheets 820a and 820b are shifted from each other in the direction along the metal sheets although there may be some overlap of the solder foils 841a, 841b and 841c. However, crests A1, A2 and A3 (extending upward in FIG. 8) which are coupled to the plain metal sheet 10 by the foil 841 are selected so that they do not overlap (in direction Y of FIG. 8) over crests B1, B2 and B3 (extending downward in FIG. 8) of the same layer of the corrugated sheet 20. For example, crests A1, A2 and A3 of sheet 820a are positioned so that they do not overlap crests B1, B2 and B3 (the crest of sheet 820a is not shown in the drawing) of sheet 820a. This relationship is also applied to the group of the peaks A1, A2, A3 and the group of the peaks B1, B2, B3 of the corrugated metal sheet 820b (though the peak A3 is not shown in the drawing).

By arranging the strips of solder foil (841a and 841b, 841c and 841d) on both sides of the corrugated metal sheet (820a, 820b) in the manner explained above, only one electric path which connects the solder foils on both sides of the respective corrugated metal sheet is formed within the corrugated metal sheet in the respective local conductive connections. For example, the solder foils 841a and 841b disposed on both sides of the corrugated metal sheet 820a are connected by a single electric path $R_A$ formed in the portion between the peaks A1 and B1 of the corrugated metal sheet 820a, and the solder foils 841c and 841d disposed on both sides of the corrugated metal sheet 820b are connected by a single electric path $R_A$ formed in the portion between the peaks A1 and B1 of the corrugated metal sheet 820b. Similarly to this, other strips of solder foils disposed on both sides of the corrugated metal sheet are connected by a single electric path formed within the corrugated metal sheet.

According to the present embodiment, only one electric path is formed within the corrugated metal sheet in each of the local conductive connections. Therefore, the cross sectional area of the electric path in the local conductive connections can be minimized. This causes the intensity of the electric current flowing through the electric path to increase, and allows the temperature of the electric path to increase in a short time with a relatively small amount of electric current. Further, since only one electric path is formed in the corrugated metal sheet in each of the local conductive connections, the electric resistance of the respective conductive connections becomes relatively large according to the present embodiment. Therefore, the number of the conductive connections which act as hot spots to initiate the catalytic reaction in the substrate can be increased to, thereby, raise the temperature of the substrate in a short time.

Figure 10:
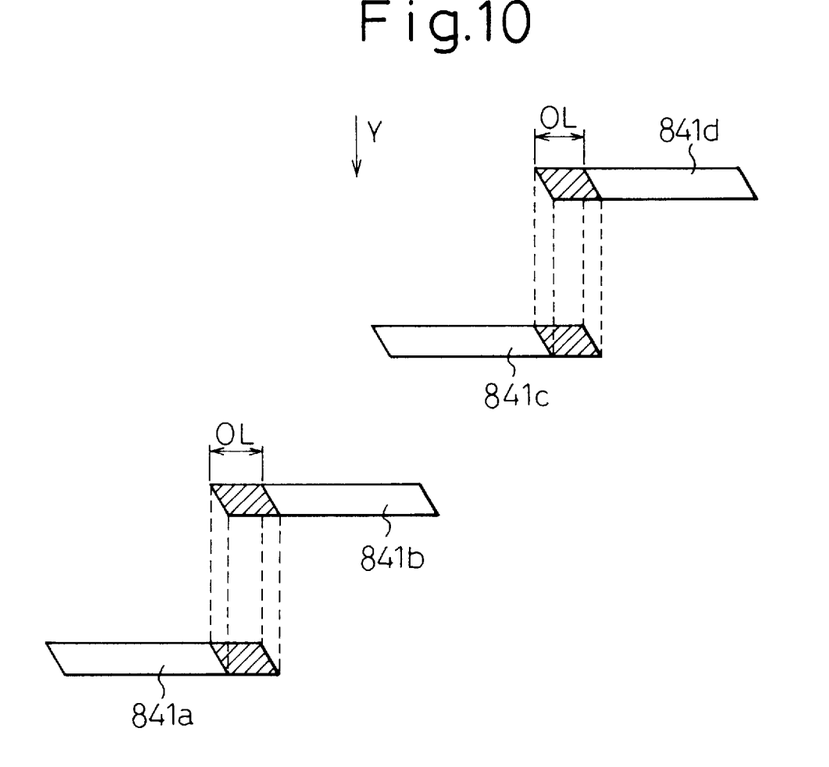
FIG. 10 schematically illustrates the arrangement of the strips of solder foils according to an embodiment of the present invention.
Figure 11:
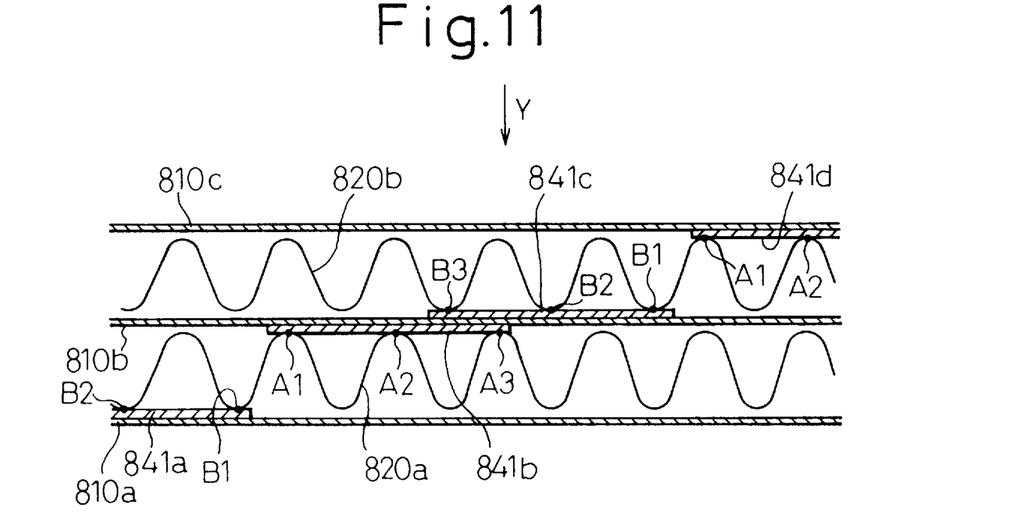
FIG. 11 schematically illustrates the electric paths formed in the corrugated metal sheet according to another embodiment of the present invention.

In the embodiment in FIG. 8, the strips of solder foil disposed on both sides of the corrugated metal sheet (841a and 841b, 841c and 841d) are arranged in such a manner that the end portions of the strips overlap each other as schematically shown by OL in FIG. 10. However, it is apparent from the above explanation that this invention can be applied to the case in which the strips of solder foil disposed on both side of the corrugated metal sheet do not have any overlapped portion when viewed from the direction perpendicular to the layers of the metal sheets. FIG. 11 shows an embodiment of the present invention in which the strips of solder foils disposed on both sides of the corrugated metal sheet do not overlap each other. In FIG. 11, the strips of solder foil (841*a* and 841*b*, 841*c* and 841*d*) disposed on both side of the corrugated metal sheet (820*a* and 820*b*) do not have any overlapped portions when viewed from the direction Y in FIG. 11. However, also in this case, the solder foils in the respective layers (841*a* and 841*b*, 841*c* and 841*d*) are disposed in such a manner that the group of the peaks of the corrugated metal sheet (for example, A1, A2 and A3 of the corrugated metal sheet 820*a* and 820*b*) which are connected to the plain metal sheet (810*b* and 810*c*) by the solder foil (841*b*, 841*d*) on one side of the corrugated metal sheet (820*a* and 820*b*) and the group of the peaks of the corrugated metal sheet (for example, B1, B2 and B3 of the corrugated metal sheet 820*a* and 820*b*) which are connected to the plain metal sheet (810*a* and 810*b*) by the solder foil (841*a*, 841*c*) on the other side of the corrugated metal sheet (820*a*, 820*b*) adjoin each other without overlapping when viewed from a direction perpendicular to the layers of the metal sheets (i.e., direction Y in FIG. 11). Therefore, only one electric path connecting the solder foils (841*a* and 841*b*, 841*c* and 841*d*) is formed within the corrugated metal sheet (820*a* and 820*b*) between the peaks A1 and B1 in this case.

Figure 9:
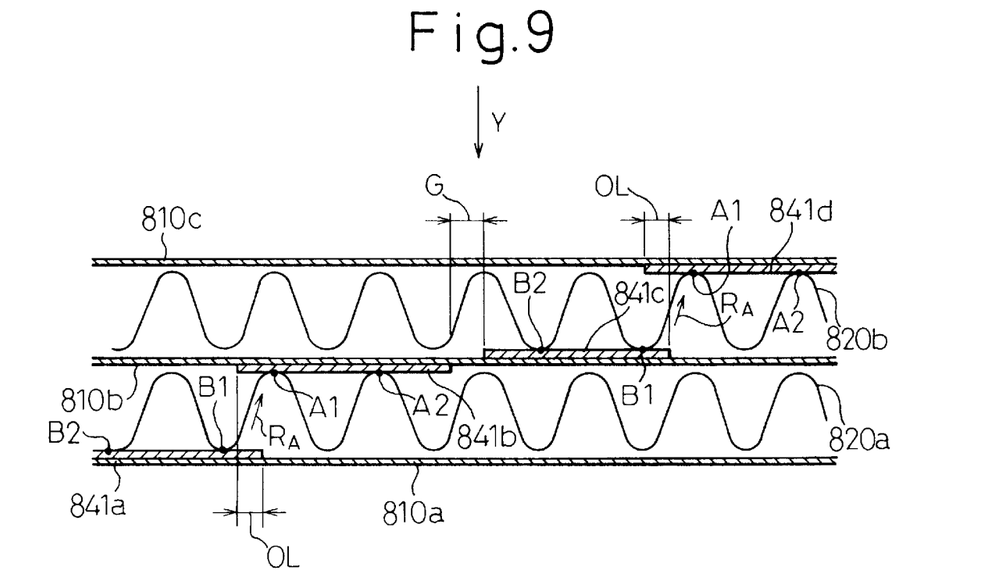
FIG. 9 schematically illustrates the electric paths formed in the corrugated metal sheet according to another embodiment of the present invention.

Further, in the embodiments in FIG. 8 and FIG. 11, the strips of solder foil disposed on both sides of the plain metal sheet (for example, 841*b* and 841*c* in FIGS. 8 and 11) overlap each other at the end portion thereof when viewed from a direction perpendicular to the layer of the metal sheets (i.e., the direction Y in FIGS. 8 and 11). However, it is also apparent from the above explanation that the these strips of solder foils (841*b* and 841*c*) do not necessarily overlap each other. For example, as shown in FIG. 9, the strips of solder foils (841*b* and 841*c*) disposed on both sides of plain metal sheet (810*b*) may be arranged in such a manner that these solder foils are disposed with a gap G therebetween when viewed from the direction Y. In this case, electric current flows from the solder foils 841*b* to 841*c* through the plain metal sheet 810*b* in the gap portion G. Therefore, by arranging the solder foils (841*b* and 841*c*) disposed on both sides of the plain metal sheet (810*b*) with a gap (G) therebetween, the electric resistance between the corrugated metal sheets (820*a* and 820*b*) can be further increased and, thereby the overall electric resistance of the substrate can be kept at a high level.

Figure 12:
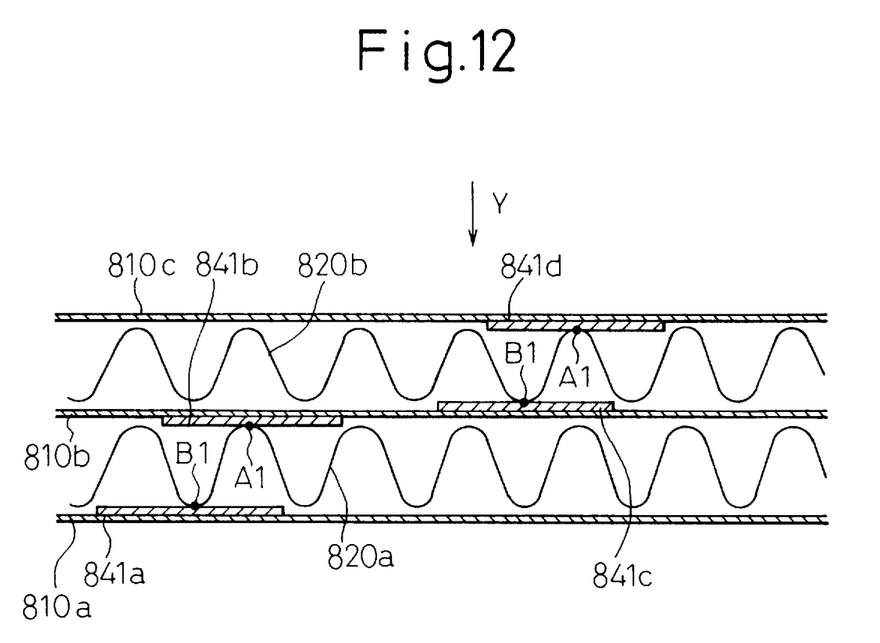
FIG. 12 schematically illustrates the electric paths formed in the corrugated metal sheet according to another embodiment of the present invention.

FIG. 12 shows another embodiment of the present invention. In the embodiments explained above, the strips of solder foil disposed on both sides of the corrugated metal sheet connect more than two peaks of the corrugated metal sheet to the respective plain metal sheet. However, the respective strips of solder foil may connect only one peak of the corrugated metal sheet to the plain metal sheet on both sides of the corrugated metal sheet. In this embodiment, as shown in FIG. 12, the respective strips of solder foil 841*a*, 841*b*, 841*c* and 841*d* connect only one peak of the corrugated metal sheets 820*a* and 820*b* to the plain metal sheets 810*a*, 810*b* and 810*c*. Namely, the strips of solder foil 841*a* connects only the peak B1 of the corrugated metal sheet 820*a* to the plain metal sheet 810*a*, and the strip of solder foil 841*b* disposed on the opposite side of the corrugated metal sheet 820*a* also connects only the peak A1 to the plain metal sheet 810*b*. Similarly to this, the solder strips 841*c* and 841*d* connect only the peaks B1 and A1, respectively, to the plain metal sheets 810*b* and 810*c*. Also, in this case, only one electric path connecting B1 and A1 through the corrugated metal sheet is formed between the pair of strips of solder foil. When more than two peaks of the corrugated metal sheet are connected to the plain metal sheet by the strips of solder foils, since the corrugated metal sheet between the peaks are subject to heat expansion, a thermal stress is imposed on the corrugated metals sheet during the operation of the engine. Therefore, there is the possibility that the corrugated metal sheet breaks due to cyclic stress caused by the operation cycles of the engine. However, since only one peak of the corrugated metal sheet is connected to the plain metal sheet in this embodiment, the thermal stress is not imposed on the corrugated metal sheet during the operation of the engine and, thereby the reliability of the electrically heated catalytic converter is largely increased. Though the strips of solder foils 841*a* and 841*b*, 841*c* and 841*d* in FIG. 12 overlap each other, the strip 841*a* and 841*b*, 841*c* and 841*d* may be disposed so that they do not overlap each other when viewed from the direction Y in FIG. 12.

As explained above, according to the present invention, since the strips of solder foil disposed on both sides of the corrugated metal sheet are arranged in such a manner that a single electric path which connects the solder foils on both sides is formed within the corrugated metal sheet in each of the local conductive connections, the substrate of the electrically heated catalytic converter can be heated up in a short time without increasing the total amount of electric current.

We claim:

1. An electrically heated catalytic converter for an engine comprising a substrate supporting a three-way reducing and oxidizing catalyst, the substrate including a laminated assembly of layers, each layer having:

a plain metal sheet;

a corrugated metal sheet;

a thin insulating layer interposed between said plain metal sheet and said corrugated metal sheet, the thin insulating layers being made of an oxide of a first metal; and a local conductive connection including strips of solder foil which electrically connect the plain metal sheet in said each layer to the corrugated metal sheet in said each layer through the thin insulating layer, said conductive connection electrically connects the corrugated metal sheet in said each layer to the plain metal sheet in the layer adjoining said each layer through the thin insulating layer, said strips of solder foil being made of a soldering material containing a second metal having larger reducing capability than said first metal, wherein said strips of solder foil are arranged in such a manner that the strips of solder foil disposed on both sides of the corrugated metal sheet define a single electric path which connects the strips of solder foil disposed on both sides of the corrugated metal sheet through the corrugated metal sheet therebetween.

2. An electrically heated catalytic converter according to claim 1, wherein the strips of solder foil disposed on both sides of the corrugated metal sheet are arranged in such a manner that the group of peaks which includes at least one peak of the corrugated metal sheet which contact with the solder foil disposed on one side of the corrugated metal sheet and the group of peaks which includes at least one peak of the corrugated metal sheet which contact with the solder foil disposed on the other side of the corrugated metal sheet do not overlap but adjoin each other when viewed from a direction perpendicular to said each layer.

3. An electrically heated catalytic converter according to claim 2, wherein the strips of solder foil disposed on both sides of the corrugated metal sheet are arranged in such a manner that they overlap each other at the end portions thereof when viewed from a direction perpendicular to said each layer.

4. An electrically heated catalytic converter according to claim 2, wherein the strips of solder foil disposed on both sides of the corrugated metal sheet are arranged in such a manner that they have no overlapped portions when viewed from a direction perpendicular to said each layer.

5. An electrically heated catalytic converter for an engine comprising a substrate supporting a three-way reducing and oxidizing catalyst, the substrate including:
- a laminated assembly of layers, each layer having:
  - a plain metal sheet;
  - a corrugated metal sheet;
  - a thin insulating layer interposed between the plain metal sheet and the corrugated metal sheet, the thin insulating layer being made of an oxide of a first metal; and
  - a first solder foil strip which electrically connects the plain metal sheet to the corrugated metal sheet through the thin insulating layer;
- a plurality of second solder foil strips electrically connecting the corrugated metal sheet in each layer to the plain metal sheet in an adjoining layer through the thin insulating layer, wherein the first and second solder foil strips are made of a soldering material containing a second metal having a reducing capability larger than that of the first metal;

wherein the first and second solder foil strips are arranged so that only one electric path connects the first solder foil strip of a respective layer with the corresponding second solder foil strip which electrically couples the respective corrugated metal sheet to the plain metal sheet of the adjoining layer.

6. An electrically heated catalytic converter according to claim 5, wherein the corrugated metal sheet defines a plurality of first peaks separated from a centerline of the corrugated metal sheet in a first direction substantially perpendicular to the centerline and a plurality of second peaks separated from the centerline in a second direction substantially opposite to the first direction, and wherein the first and second solder foil strips are arranged so that adjoining first and second peaks contact the first solder foil strip and the corresponding second solder foil strip, respectively, wherein the corrugated metal sheet extends between the adjoining first and second peaks with no peaks located therebetween and wherein for each layer, all first peaks which contact the first solder foil strip are separated from the adjoining first and second peaks in a third direction along the centerline and all second peaks which contact the corresponding second foil strip are separated from the adjoining first and second peaks in a fourth direction opposite the third direction.

7. An electrically heated catalytic converter according to claim 6, wherein the an end portion of the first solder foil strip of each layer of the corrugated metal sheet extends in the fourth direction past an end portion of the corresponding second solder foil strip.

8. An electrically heated catalytic converter according to claim 6, wherein the end portions of the first solder foil strip of each layer of the corrugated metal sheet are separated in the fourth direction from an end portion of the corresponding second solder foil strip so that corresponding first and second solder foil strips do not overlap each other in the fourth direction.

* * * * *

UNITED STATES PATENT AND TRADEMARK OFFICE
CERTIFICATE OF CORRECTION

PATENT NO. : 5,851,495
DATED : December 22, 1998
INVENTOR(S) : Kouji YOSHIZAKI, et al.

It is certified that error appears in the above-identified patent and that said Letters Patent is hereby corrected as shown below:

ABSTRACT, line 10, change "foils" to --foil--.

ABSTRACT, line 12, change "defines" to --define--.

Column 1, line 35, change "act" to --acts--.

Column 1, line 54, change "connects" to --connect--.

Column 2, line 6, change "reactions" to --reaction--.

Column 2, line 7, change "portion" to --portions--.

Column 2, line 13, change "area" to --areas--.

Column 2, line 30, change "20A" to --$20_A$--.

Column 2, line 44, change "numbers" to --number--.

Column 3, line 3, change "become" to --becomes--.

Column 3, line 27, delete "the" before "each layer" in both occurrences.

UNITED STATES PATENT AND TRADEMARK OFFICE
CERTIFICATE OF CORRECTION

PATENT NO. : 5,851,495
DATED : December 22, 1998
INVENTOR(S) : Kouji YOSHIZAKI, et al.

It is certified that error appears in the above-identified patent and that said Letters Patent is hereby corrected as shown below:

Column 3, line 30, delete "the" before "each".

Column 3, line 31, delete "the" before "each".

Column 3, line 41, change "foils" to --foil--.

Column 3, line 42, change "may be, or may not be, overlapped" to --may or may not overlap--.

Column 3, line 49, change "are" to --is--.

Column 4, line 34, insert --to-- after "according".

Column 5, line 42, change "act" to --acts--.

Column 5, line 57, change "portion" to --portions--.

Column 6, line 8, before "total" insert --the--.

Column 7, line 62, change "sheet" to --sheets--.

Column 8, line 15, after "crest" insert --B3--.

Column 8, line 62, change "side" to --sides--.

Column 8, line 66, change "foils" to --foil--.

Column 9, line 2, change "side" to --sides--.

UNITED STATES PATENT AND TRADEMARK OFFICE
CERTIFICATE OF CORRECTION

PATENT NO. : 5,851,495
DATED : December 22, 1999
INVENTOR(S) : Kouji YOSHIZAKI, et al.

It is certified that error appears in the above-identified patent and that said Letters Patent is hereby corrected as shown below:

Column 9, line 28, delete "these" at end of line.

Column 9, line 29, change "foils" to --foil--.

Column 9, line 55, change "connects" to --connect--.

Column 9, line 66, change "foils" to --foil-- and change "sheet" to --sheets--.

Column 10, line 1, change "metals sheet" to --metal sheets--.

Column 10, line 10, change "foils" to --foil--.

Column 10, line 11, change "strip" to --strips--.

Column 10, line 32, change "layers" to --layer--.

Column 12, line 19, delete "the" after "wherein".

Signed and Sealed this

Twenty-sixth Day of October, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,851,495
DATED : December 22, 1998
INVENTOR(S) : Kouji Yoshizaki, et. al.

It is certified that error appears in the above-identified patent and that said Letters Patent is hereby corrected as shown below:

Title page, item [73] Assignee, should read -- Toyota Jidosha Kabushiki Kaisha, Aichi, Japan And Nippon Steel Corporation, Tokyo, Japan --.

Signed and Sealed this

Twenty-eighth Day of December, 1999

*Attest:*

Q. TODD DICKINSON

*Attesting Officer*  *Acting Commissioner of Patents and Trademarks*